United States Patent [19]

Joerg et al.

[11] Patent Number: 5,390,755
[45] Date of Patent: Feb. 21, 1995

[54] POWER STEERING SERVO CONTROL FOR MOTOR VEHICLES

[75] Inventors: Wolfgang Joerg, Stuttgart; Arno Roehringer, Ditzingen, both of Germany

[73] Assignee: Mercedes-Benz AG, Stuttgart, Germany

[21] Appl. No.: 164,931

[22] Filed: Dec. 10, 1993

[30] Foreign Application Priority Data

Dec. 10, 1992 [DE] Germany .............................. 4241531

[51] Int. Cl.$^6$ ............................................. B62D 5/08
[52] U.S. Cl. .................. 180/146; 91/375 R; 180/132
[58] Field of Search ................... 180/132, 146, 149; 91/375 R, 375 A; 74/388 PS

[56] References Cited

U.S. PATENT DOCUMENTS 4,251,194  2/1981  Petersen ............................ 180/132 X
5,103,715  4/1992  Phillips .................................. 91/375

FOREIGN PATENT DOCUMENTS 3925992  2/1991  Germany .
2165502  4/1986  United Kingdom .
2234476  2/1991  United Kingdom .

Primary Examiner—Karin L. Tyson
Assistant Examiner—Victor E. Johnson
Attorney, Agent, or Firm—Evenson, McKeown, Edwards & Lenahan

[57] ABSTRACT

A servo control is disclosed especially for a power steering for motor vehicles. A shaft serves as an actuating member and is subdivided axially into a primary shaft and a secondary shaft. The two shaft parts are coupled elastically to one another via a torsion bar and a prestressed leg spring acting parallel thereto. Accordingly, a relative rotation adjusting a servo-valve arrangement can occur between the two shaft parts only when the shaft is loaded by a torque which exceeds the prestress of the leg spring.

4 Claims, 2 Drawing Sheets

POWER STEERING SERVO CONTROL FOR MOTOR VEHICLES

BACKGROUND AND SUMMARY OF THE INVENTION

The invention relates to a servo control, especially for power steering for motor vehicles, with a shaft which serves for actuation and is subdivided axially into an input-side primary-shaft part and an output-side secondary-shaft part. One shaft part projects axially into a bush part coupled fixedly in terms of rotation to the other shaft part and forms with the latter a servo-valve arrangement working in dependence on relative rotations between the shaft parts, in the manner of a rotary-slide arrangement. A torsion bar connects the shaft parts in a rotationally elastic manner and is arranged in an axial bore of the shaft parts so as to leave an annular space free in the one shaft part. A prestressed spring is provided which is effective between the bush part and the one shaft part and the prestress of which seeks to keep the bush part and the one shaft part in a middle position relative to one another.

A corresponding power steering is the subject of British Patent Document GB 2,165,502 A. The prestressed spring determines a minimum torque which has to take effect on the shaft in order to obtain an adjustment of the servo-valve arrangement out of the middle position or neutral position. Moreover, this spring, together with the prestress-free torsion bar, determines the amount of further adjustment of the servo-valve arrangement in the event of torques which increase further.

This arrangement ensures that the servo control or power steering works purely mechanically, that is to say without power assistance, within a range of steering forces which is predetermined by the prestress of the prestressed spring. This guarantees, where a power steering of a motor vehicle is concerned, that the driver acquires a good feel for the steering forces actually effective on the steering wheels of the vehicle.

German Patent Document DE 3,925,992 A1 discloses a further servo control or power steering, in which two coaxial shaft parts are coupled to one another positively, but with play, in such a way that limited relative rotations between these parts are possible counter to the resistance of a prestressed leg spring arranged between them. These relative rotations bring about a pivoting stroke of a lever which is arranged between the shaft parts and which thereby actuates the control slide of a servo-valve arranged in the one shaft part. The prestressed leg spring projects with two radial legs into axial slots corresponding to one another in axially mutually overlapping endpieces of the two shaft parts. The mounting of the leg spring is comparatively complicated, since a visual check is possible only to a restricted extent and the lever actuating the control slide of the servo-valve also has to be mounted between the two endpieces.

An object of the invention is to achieve an even further constructive simplification in a servo control of the type mentioned in the introduction.

This object is achieved, according to the invention, in that the one shaft part and the bush part have, at their ends facing the other shaft part, corresponding axial slots open towards the other shaft part, and in that there is arranged as a prestressed spring in the annular space between the torsion bar and the one shaft part a leg spring, the legs of which project into respective corresponding axial slots of the bush part and of the one shaft part and, in the circumferential direction of the shaft axis, have a smaller cross-section than the axial slots and, in the middle position, rest on respective corresponding axial edges of the two axial slots.

As a result of the design according to the invention, the mounting of the leg spring and the coupling of the other shaft part take place on the same end face of the bush part. Accordingly, after the arrangement of the bush part on the one shaft part, that is to say after the mounting of the servo-valve arrangement, the leg spring and the further shaft part can be arranged and connected to the bush part respectively. This results in a mounting sequence which can be carried out in a simple way, whilst the arrangement of the leg spring can be carried out completely with a visual check.

Moreover, it is advantageous that, in this design, the legs of the leg spring can also act as a limitation for the maximum relative rotation between the shaft parts.

According to an expedient embodiment of the invention, the leg spring has a flat characteristic, that is to say the prestress of the leg spring is increased only relatively little in the event of additional elastic deformation of the latter. In contrast, the prestress free torsion bar can have a comparatively steep characteristic, that is to say, in order to achieve an additional torsion of the torsion bar, the torques must increase comparatively sharply.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
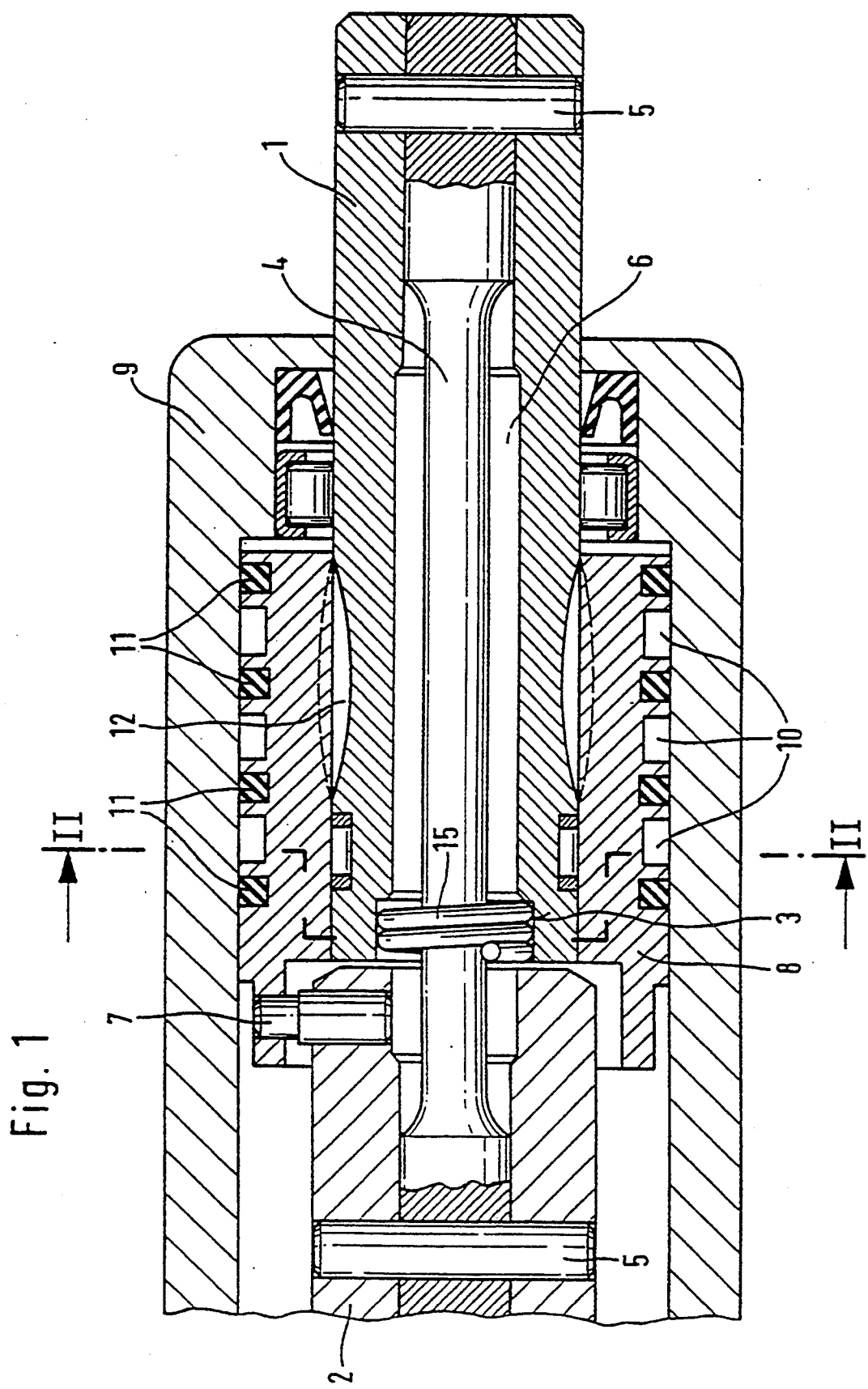
FIG. 1 shows an axial section through a power steering arrangement constructed according to a preferred embodiment of the invention.

A steering handwheel (not shown) of a motor vehicle and its steering wheels or its steering gears are drive-coupled to one another via a steering shaft which has a primary-shaft part 1 and a coaxial secondary-shaft part 2. The shaft parts 1 and 2 are designed as tubular parts and directly adjoin one another axially. On the end face confronting the secondary-shaft part 2, the primary-shaft part 1 is widened on the inside, so as to produce an inner circumferential groove 3, of which the flank on the right in the drawing is formed by an annular step within the primary-shaft part 1 and of which the flank on the left is formed by the end edge of the secondary-shalt part 2.

Arranged in the interior of the two shaft parts 1 and 2 is a torsion bar 4 which is connected at its ends to the shaft parts 1 and 2 fixedly in terms of rotation by means of crosspins 5. Between these ends, the torsion bar 4 has a cross-section reduced in relation to the cross-section of the interiors of the shaft parts 1 and 2, so that an annular space 6 remains free.

Arranged on the end face of the secondary-shaft part 2 confronting the primary-shaft part 1 is a radial driving pin 7, via which a bush 8 arranged rotatably on the primary-shaft part 1 is coupled fixedly in terms of rotation to the secondary-shaft part 2.

The bush 8 is encased by a stationary housing 9.

A plurality of annular grooves 10 is arranged on the outer circumferential side of the bush 8, so as to form between the bush 8 and the inside of the housing corresponding annular spaces which are closed off by means of lateral sealing rings 11.

The annular spaces formed by the annular grooves 10 are connected via housing-side connections (not shown) to hydraulic lines of a servo-system, the servo-valve arrangement of which is formed in a basically known way by the bush 8 and by a region of the primary-shaft part 1 covered by the latter, control edges 12 being arranged between the bush 8 and primary-shaft part 1, so that, during a relative rotation between the bush 8 and primary-shaft part 1, a more or less large pressure difference can be generated between connections of a servo-motor.

Figure 2:
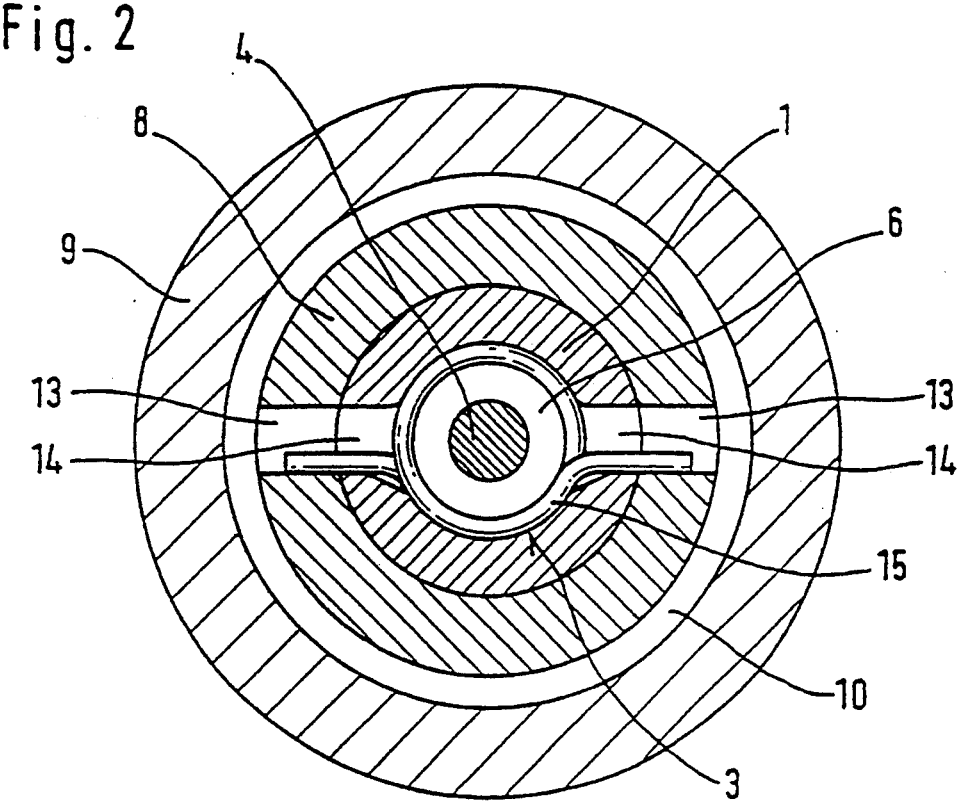
FIG. 2 shows a radial section corresponding to the sectional line II—II in FIG. 1.

According to FIG. 2, axial slots 13 and 14 located diametrically opposite one another and open towards the end faces of the primary-shaft part 1 and the bush 8 are arranged on the end faces of the primary-shaft part 1 and of the bush 8 which confront the secondary-shaft part 2. In the circumferential direction of the primary-shaft part 1 and the bush 8, the axial slots 13 and 14 have equal widths, so that their axial edges are in alignment with one another in the middle position shown in FIG. 2.

The legs of a leg spring 15 arranged within the inner circumferential groove 3 of the primary-shaft part 1 and annularly surrounding the torsion bar 4 project into the axial slots 13 and 14, that is to say the legs of the leg spring are connected to one another by means of a helical spring region. In the middle position according to FIG. 2, the legs rest with prestress on the lower axial edges of the two axial slots 13 and 14 and correspondingly seek to keep the primary-shaft part 1 and the bush 8 (as well as the secondary-shaft part coupled fixedly in rotation to the bush 8) in the middle position.

The primary-shaft part 1 and the bush 8 can be rotated relative to one another out of this middle position only when a torque exceeding the prestress of the leg spring 15 takes effect.

This relative rotation is possible because the axial slots 13 and 14 have a width, as measured in the circumferential direction of the primary-shaft part 1 and the bush 8, which is clearly larger than the thickness of the legs of the leg spring 15.

Figure 3:
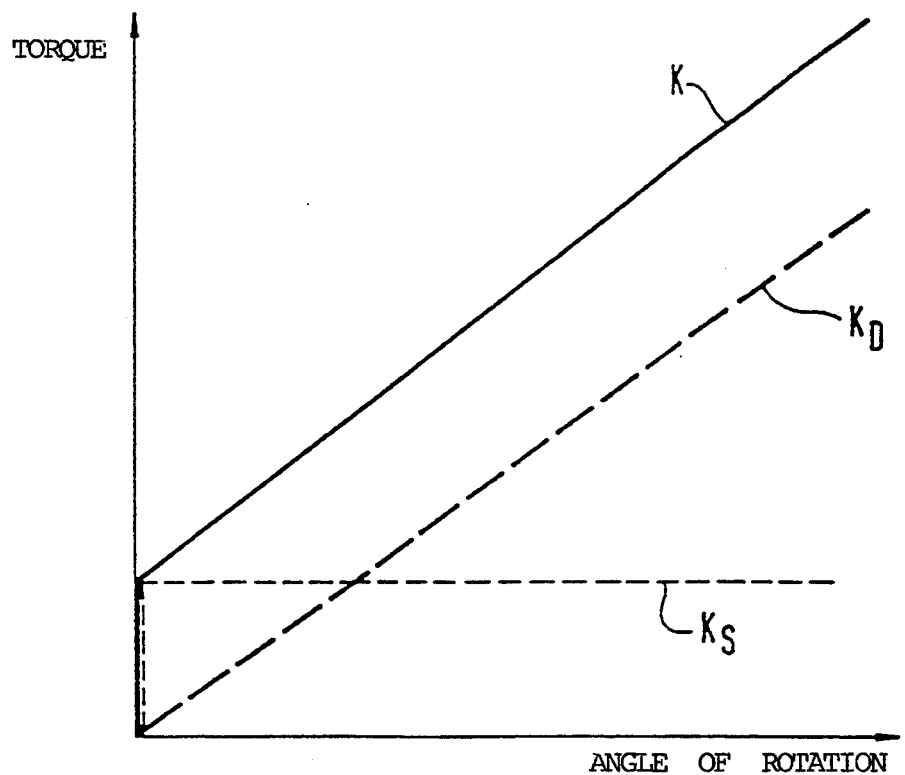
FIG. 3 shows the spring characteristic of the torsion bar and leg spring.

FIG. 3 shows the characteristics of the torsion bar 4 and leg spring 15. The angle of rotation is plotted on the abscissa, whilst the torque is plotted on the ordinate. The curve $K_D$ (corresponding to the torque based on the torsion bar spring constant times the angle of rotation) shows the conditions when the leg spring 15 is omitted. With a rotation of the primary shaft 1 and the bush 8 or secondary shaft 2 relative to one another, increasing in relation to a middle position, a clearly increasing torque occurs.

The curve $K_S$ (corresponding to the torque based on the leg spring coefficient times the angle of rotation) shows the conditions when the torsion bar 4 is omitted. As a result of the prestress of the leg spring 15, a relative rotation between the primary-shaft part 1 and the bush 8 or secondary-shaft part 2 in relation to the middle position is achieved only when a minimum torque is effective. With an increasing angle of rotation, the torque then increases only moderately.

The curve K shows the conditions when the torsion bar 4 and leg spring 15 are jointly effective. It can be seen that the minimum torque which has to be exceeded in order to obtain an angle of rotation relative to the middle position is determined by the leg spring 15. The further increase in the torque is then determined predominantly by the torsion bar 4.

In connection with the power steering, this means that power assistance takes effect only when the said minimum torque occurs between the primary-shaft part 1 and secondary-shaft part 2. In the event of lower torques, no power assistance takes effect, that is to say the steering works purely mechanically.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Serve control for power steering for a motor vehicle, comprising:
   a shaft which serves for actuation and is subdivided axially into an input side primary shaft part and an output side secondary shaft part, said input shaft part projecting axially into a bush part coupled fixedly in terms of rotation to the output shaft part and forms with the latter a servo-valve arrangement working in dependence on relative rotations between the input and output shaft parts, in the manner of a rotary-slide arrangement,
   a torsion bar which connects the shaft parts in a rotationally elastic manner and which is arranged in aligned axial bores of the shaft parts, said torsion bar having a smaller diameter than the axial bore in the input shaft part so as to leave an annular space free in the input shaft part, and
   a prestressed spring which is effective between the bush part and the input shaft part and the prestress of which seeks to keep the bush part and the input shaft part in a middle position relative to one another,
   wherein the input shaft part and the bush part have corresponding axial slots open towards the output shaft part, said axial slots being disposed at respective ends of the input shaft part and the bush part which face the other shaft part, and wherein the prestressed spring is a leg spring arranged in the annular space between the torsion bar and the input shaft part, legs of the leg spring projecting respectively into corresponding axial slots of the bush part and of the input shaft part said legs having a smaller cross-section in a circumferential direction of a shaft axis than the axial slots, said legs resting in a middle position on respective corresponding axial edges of the axial slots.

2. Servo control according to claim 1, wherein the bush part is coupled fixedly in terms of rotation to the output shaft part via a driving pin.

3. Servo control according to claim 1, wherein the leg spring has a flat characteristic, while the torsion bar has a steep characteristic.

4. Servo control according to claim 2, wherein the leg spring has a flat characteristic, while the torsion bar has a steep characteristic.

* * * * *